United States Patent [19]

Osawa

[11] Patent Number: 4,466,709
[45] Date of Patent: Aug. 21, 1984

[54] ZOOM LENS LOCKING SYSTEM

[75] Inventor: Masami Osawa, Saitama, Japan

[73] Assignee: Kino Precision Industries, Ltd., Tokyo, Japan

[21] Appl. No.: 344,769

[22] Filed: Feb. 1, 1982

[30] Foreign Application Priority Data

Sep. 11, 1981 [JP] Japan ................... 56-136103[U]

[51] Int. Cl.³ ............................................. G02B 15/18
[52] U.S. Cl. .................................................... 350/429
[58] Field of Search ........................................... 350/429

[56] References Cited

U.S. PATENT DOCUMENTS 3,277,783 10/1966 Eggert ................................. 350/429
4,229,074 10/1980 Nonogaki ............................. 350/429

Primary Examiner—John K. Corbin
Assistant Examiner—Rebecca D. Gass
Attorney, Agent, or Firm—Fulwider, Patton, Rieber, Lee & Utecht

[57] ABSTRACT

A locking system is provided for selectively locking the operating ring of a zoom lens against axial displacement with respect to a zoom lens housing to secure optical elements of the zoom lens in a selected position of magnification adjustment. The locking system comprises a cam sleeve concentrically within the operating ring and constrained for axial movement with the operating ring upon adjustment of image magnification. The cam sleeve includes a generally helical cam groove for receiving a cam pin on the lens housing such that the cam sleeve is forced to rotate with respect to the operating ring when the operating ring is moved axially. A slide switch on the operating ring selectively moves a ratchet into locking engagement with a toothed rack at one end of the cam sleeve to prevent relative rotation of the cam sleeve with respect to the operating ring and thereby lock the operating ring against axial movement.

20 Claims, 5 Drawing Figures

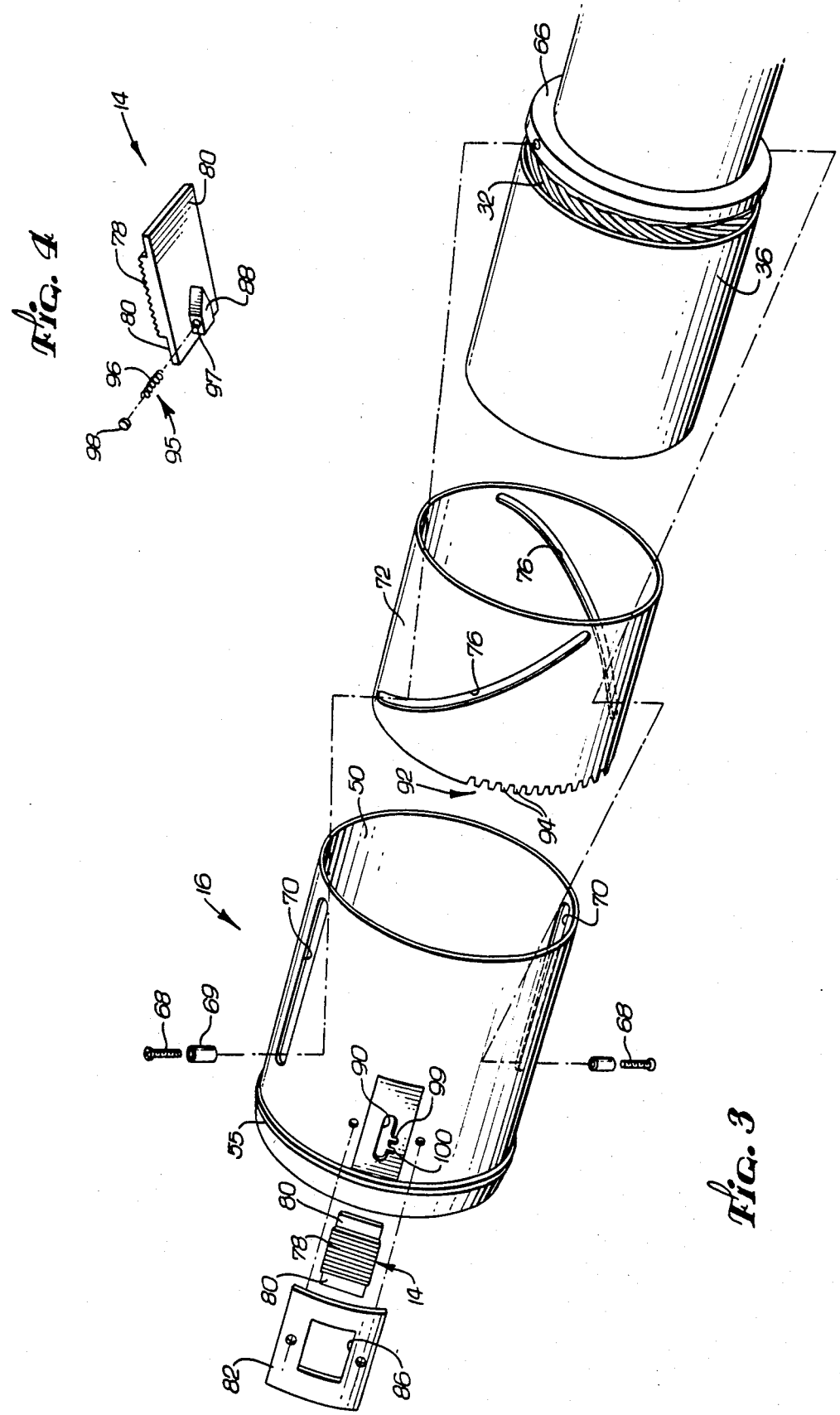

ZOOM LENS LOCKING SYSTEM

BACKGROUND OF THE INVENTION

This invention relates generally to improvements in photographic lenses of the type commonly referred to as a zoom lens wherein the lens is adjustable to select the magnification of the image being photographed. More particularly, this invention relates to an improved locking system for releasably locking the zoom lens in a selected magnification setting.

Zoom lenses in general are known in the art and typically comprise a plurality of optical elements mounted within a lens housing which is in turn adapted for mounting upon a camera. The optical elements of the zoom lens cooperate to provide a so-called telephoto lens capable of producing a relatively large image of a distant object. Importantly, the various optical elements are mounted on different portions of the lens housing which are mechanically movable relative to one another to permit controlled adjustment of the image focus and the image magnification.

More specifically, in a typical zoom lens, the forwardmost optical element comprises a focusing element mounted for precisely controlled axial displacement in response to rotation of a revolving housing portion to adjust the image focus. At least one optical element positioned between the focusing element and the camera constitutes a zoom element movable in response to axial sliding motion of another portion of the lens housing. Both of these movements are commonly controlled by an operating ring carried about the lens housing for appropriate rotational movement to select image focus and axial sliding movement to select image magnification.

A significant problem encountered with prior art zoom lenses is that the operating ring tends to creep axially during use or handling of the camera, resulting in an inadvertent and undesired alteration of the magnification setting. For example, the weight of the zoom optical element is frequently sufficient to cause the operating ring to creep axially under the influence of gravity whenever the zoom lens is oriented angularly with respect to the horizontal plane. Moreover, the operating ring is easily displaced from its desired position of axial adjustment by bumping or by centrifugal forces as the lens is moved or carried about. The photographer must therefore hold the operating ring manually and/or repeatedly recheck and reset the magnification setting during use of the zoom lens.

One locking system for releasably locking the operating ring in a selected position of axial adjustment is disclosed in commonly assigned, copending application Ser. No. 331,121, filed Dec. 16, 1981. This locking system comprises a spring-loaded ratchet on the operating ring biased into normal engagement with a toothed rack on another portion of the lens housing to lock the operating ring against axial displacement. The ratchet is manually retracted from the rack by depression of a spring-loaded button to permit movement of the operating ring to an alternative axial position. Accordingly, the button must be held continuously in the depressed position throughout the adjustment period. If it is desired to operate the zoom lens in a conventional unlocked mode, it is necessary to provide additional mechanical devices to lock the button in the depressed position. Such additional mechanical devices undesirably increase the overall cost and complexity of the zoom lens.

The present invention overcomes the problems and disadvantages of the prior art by providing an improved zoom lens having a relatively inexpensive and simple integrated locking system for movement between a locked position preventing axial adjustment of the operating ring to correspondingly lock the zoom lens in a selected magnification setting and an unlocked position permitting axial movement of the operating ring.

SUMMARY OF THE INVENTION

In accordance with the invention, an improved locking system for a zoom lens is provided for releasably locking the zoom lens in a selected magnification setting. The zoom lens includes a plurality of optical elements mounted within a lens housing, wherein at least one of the optical elements is a zoom element mounted for axial movement along with an axially movable cylindrical operating ring to adjust the magnification of the photographic image. A cam sleeve is positioned concentrically within the operating ring and is constrained for simultaneous axially sliding and rotational movement in response to axial movement of the operating ring. Toothed locking members on the operating ring and on the cam sleeve are selectively engageable to prevent rotation of the cam sleeve relative to the operating ring and thereby lock the sleeve and ring against axial movement.

According to a preferred form of the invention, the zoom lens comprises a fixed housing portion adapted for connection to a camera and a revolving housing portion carried by the fixed housing portion for revolving motion within a circumferential spiraling track to adjust the precise axial position of a focusing optical element at the front of the zoom lens. The zoom optical element is carried by an axially slidable housing portion between the focusing element and the camera for axial movement to adjust the magnification setting. The operating ring is mounted about the fixed housing portion for substantially independent revolving movement to adjust the position of the revolving housing portion and axially sliding movement to adjust the axial position of the sliding housing portion.

The cam sleeve is positioned concentrically within the operating ring in a position axially between a pair of radially inwardly projecting shoulders on the operating ring such that the cam sleeve is constrained for axially sliding movement along with the operating ring when the magnification setting is adjusted. However, the cam sleeve rotates relative to the operating ring during such axial sliding movement by virtue of a cam pin on the revolving housing portion which projects radially outwardly into a generally helical cam groove in the cam sleeve, whereby the pin translates along the cam groove during axial movement of the cam sleeve.

Relative rotation between the cam sleeve and the operating ring is selectively prevented by a ratchet mounted on the operating ring for movement into locking engagement with a toothed rack on the cam sleeve defined by a plurality of axially projecting rack teeth. More particularly, the ratchet is carried by a slide switch for movement between a locked position in locking engagement with the rack to prevent rotation of the cam sleeve and thereby prevent axial movement of the sleeve or the operating ring to adjust magnification setting. The slide switch is further movable to an unlocked position with the ratchet retracted from the rack to permit free adjustment of the magnification setting. A spring-detent mechanism releasably retains the slide switch in either the locked or the unlocked position.

Other features and advantages of the present invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 3 is an exploded perspective view illustrating the construction and operation of the locking system;

FIG. 4 is an enlarged perspective view illustrating further construction details of a portion of the locking system.

DETAILED DESCRIPTION OF THE PREFERRED EMBODIMENT

Figure 1:
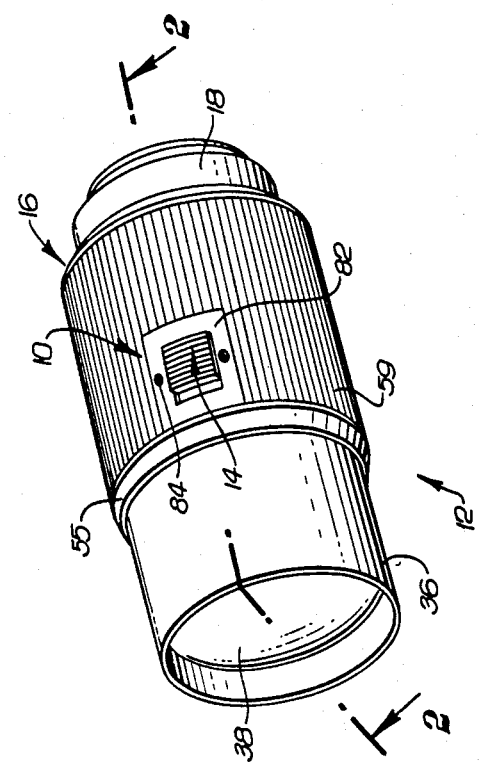
FIG. 1 is a perspective view of a zoom lens including a locking system embodying the novel features of this invention.

As illustrated in the exemplary drawings, the invention is embodied in a locking system designated generally by the reference numeral 10 for use in locking a zoom lens 12 in a selected position of magnification adjustment. As shown in FIG. 1, the locking system 10 includes a slide switch 14 mounted in an accessible position on the operating ring 16 of the zoom lens, and this slide switch is selectively moved by the photographer back and forth between a first position locking the operating ring 16 in a selected axial position of adjustment to fix the magnification setting and a second position unlocking the operating ring to permit axial sliding movement of the ring and thereby allow alteration of the magnification setting.

The general construction and operation of the zoom lens 12 is generally conventional in form, with the addition of the locking system 10 of this invention. More particularly, with reference to FIGS. 1 and 2, the zoom lens 12 comprises a multiple component lens housing adapted for mounting upon a camera. The various portions of the lens housing carry a plurality of optical elements which cooperate with each other to form a so-called telephoto lens for producing a large image of a distant object. The housing portions are coupled for mechanical movement with respect to each other to alter the relative positions of the optical elements for purposes of adjusting the image focus and the image magnification.

The exemplary zoom lens 12 is shown to include a generally cylindrical fixed housing portion 18 at the rear of the lens wherein this fixed housing portion 18 is appropriately sized and shaped for mounting upon the front of a camera (not shown). This fixed housing portion 18 normally supports one or more optical elements 19 in close fixed relation to the camera. If desired, this fixed housing portion may support a variety of conventional auxiliary equipment, such as adapter rings to permit mounting upon particular brands and types of cameras and/or aperture setting apparatus or the like. However, the auxiliary equipment does not form an integral part of the locking system 10 of this invention, whereby such auxiliary equipment if not shown or described herein.

The fixed housing portion 18 is securely connected to a cylindrical sleeve 20 which projects fowardly toward the front of the zoom lens. The forwardmost end of this sleeve 20 terminates in a radially enlarged boss 21 having a radially outwardly presented circumferential threaded track 23 of a relatively small lead angle for threaded reception into the forwardmost end of an annular revolving housing portion 30 having a complementary radially inwardly presented threaded track 25. The revolving housing portion 30 thus extends from the boss 21 in a rearward direction spaced concentrically about a portion of the cylindrical sleeve 20.

The outer circumference of the revolving housing portion 30 includes a spiraling track 32 of relatively large lead angle for threadably engaging a radially inwardly presented spiraling track 34 of complementary shape formed on a forwardly projecting cylindrical casing 36. This cylindrical casing 36, as viewed in FIG. 2, provides a mounting base for a forwardmost optical element 38 of the zoom lens 12, wherein this optical element 38 constitutes a focusing element movable axially to adjust the image focus.

Axial movement of the focusing element 38 is achieved by rotation of the revolving housing portion 30 to translate the cylindrical casing 36 axially with respect to the spiraling track 32. More particularly, the cylindrical casing 36 is constrained against rotational movement by a plurality of tabs 42 which are secured to the sleeve boss 21 by screws 22 or the like and project radially outwardly into axially elongated grooves 40 in the casing 36. Accordingly, when the revolving housing portion 30 is rotated, the tabs 42 prevent corresponding rotation of the casing 36 such that the casing displaces axially along the track 32 to alter the axial position of the focusing element 38. Importantly, the revolving housing portion 30 is rotated by operation of the operating ring 16, as will be described in more detail.

Figure 2:
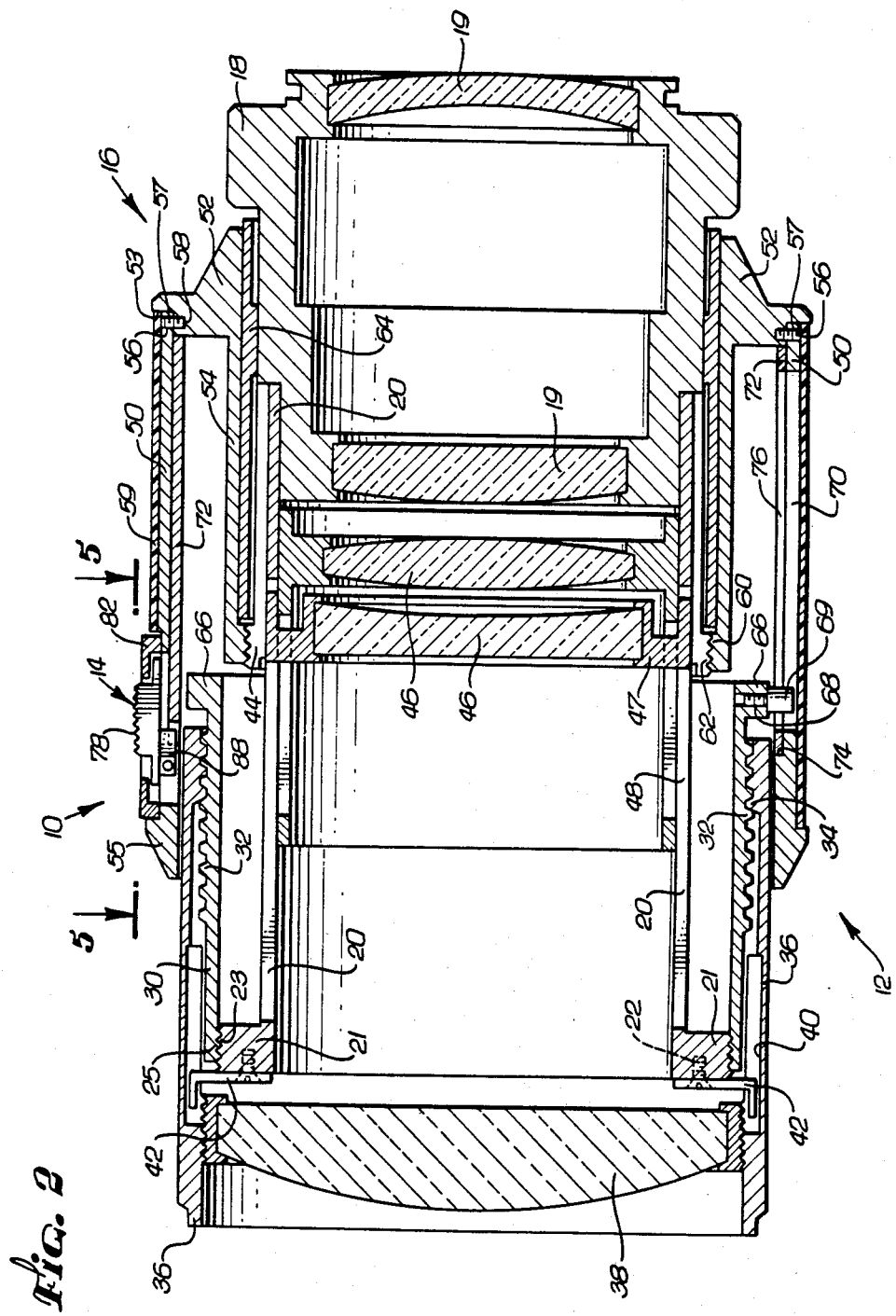
FIG. 2 is a longitudinal section of the zoom lens taken generally on the line 2—2 of FIG. 1.

The zoom lens 12 further includes an axially sliding housing portion 44 carrying at least one zoom optical element 46, with two elements 46 being illustrated in FIG. 2. As shown, this axially sliding housing portion 44 is carried about the fixed sleeve 20 for relatively smooth and wobble-free axial sliding motion. The housing portion 44 includes radially inwardly projecting mounting arms 47 which extend through aligned axially extending slots 48 in the fixed sleeve 20 to provide appropriate mounting bases for the zoom elements 46. The zoom elements 46 may thus be shifted in position axially with respect to the fixed housing portion 18 and the focusing element 38 to adjustably select the image magnification setting, all in a well-known manner.

The image focus and image magnification setting functions are typically combined into the operating ring 16. More specifically, the operating ring 16 comprises an axially elongated cylindrical member mounted about the remaining housing portions for rotational movement with respect to the fixed and sliding housing portions 18 and 44 and for axially sliding movement with respect to the fixed and revolving housing portions 18 and 30. With this construction, the operating ring can be rotated to rotate the revolving housing portion 30 and thereby adjust the image focus setting substantially independent of the magnification setting. Alternatively, the operating ring can be moved axially to adjust the position of the sliding housing portion 44 and thereby adjust the image magnifiction setting substantially independent of the focus setting.

The exemplary operating ring 16 is shown in detail in FIGS. 2 and 3 to include a generally cylindrical collar 50 having a diameter sufficient for relatively free sliding and rotational movement about the cylindrical casing 36 and the revolving housing portion 30. This collar 50 is secured at its rearmost end to a radially enlarged flange 52 of an inner slide cylinder 54 by use of a plurality of set screws 56 received through holes 57 in the collar 50 and fastened into a groove 58 in the flange 52. Conveniently, the flange 52 provides an upstanding shoulder 53 cooperating with a similar shoulder 55 formed integrally at the front of the collar 50 to define a shallow circumferential recess for receiving an outer wrap 59 of a knurled or roughened surface texture which can be grasped easily to facilitate manipulation of the operating ring during use of the zoom lens.

The slide cylinder 54 is in turn coupled to the axially sliding housing portion 44 by means of interengaging mating annular sets of threads 60 and 62. These thread sets 60 and 62 are configured to have a relatively small lead angle such that rotational motion of the operating ring 16 is accommodated without significant axial translation of the sliding housing member 44 and the associated zoom elements 46. However, the thread sets 60 and 62 couple axial sliding motion of the operating ring 16 directly to the sliding housing portion 44. Accordingly, axial sliding movement of the operating ring 16 displaces the sliding housing portion 44 and the zoom elements 46 in the axial direction to adjust the image magnification setting. Conveniently, a track member 64 secured to the fixed housing portion 18 supports the slide cylinder 54 for smooth, substantially wobble-free sliding movement.

The operating ring 16 is further coupled to the revolving housing portion 30 for rotating the revolving housing portion in response to rotational movement of the operating ring. More particularly, the revolving housing portion 30 has a radially enlarged flange 66 at its rearmost end wherein this flange 66 provides a mounting base for threadably receiving a pair of radially outwardly projecting cam pins 68 each carrying a smooth-surfaced slide sleeve 69 of nylon or the like. These cam pins 68 project into an associated pair of axially elongated slots 70 formed in the operating ring collar 50. Accordingly, rotational movement of the operating ring 16 causes the longitudinal side margins of the slots 70 to engage the cam pins 68 and rotate the revolving housing portion 30. This rotation, as described above, forces the cylindrical casing 36 to displace axially for adjustment of the axial position of the focusing element 38. However, the slots 70 in the operating ring collar 50 permit axial sliding movement of the operating ring 16 without requiring rotation or axial displacement of the revolving housing portion 30.

The locking system 10 of this invention is provided for selectively locking the operating ring 16 against axial displacement with respect to the remaining housing portions of the zoom lens in order to fix the zoom elements 46 in the selected magnification setting. The locking system 10 therefore provides a substantial improvement over conventional zoom lenses of the prior art in that the magnification setting cannot be altered until the locking system is moved to an unlocked condition to permit axially sliding motion of the operating ring. The magnification setting thus cannot be altered inadvertently as a result of bumping or in response to gravitational and/or centrifugal forces encountered during handling and use of the zoom lens.

The locking system 10 comprises a cylindrical cam sleeve 72 sized for relatively snug reception concentrically within the operating ring collar 50 and concentrically about the revolving housing portion 30 and the cylindrical casing 36. This cam sleeve 72 is positioned axially between the upstanding flange 52 of the slide cylinder 54 and a radially inwardly projecting shoulder 74 near the front of the collar 50. Accordingly, the cam sleeve is required to move axially with the operating ring when the image magnification setting is adjusted.

The cam sleeve 72 further includes a pair of matching and generally opposed, generally helical cam grooves 76 each extending axially for a substantial portion of the axial sleeve length and wrapping in a spiral manner through an arcuate width of approximately 90 degrees. These cam grooves 76 are positioned for passage of the cam pins 68 mounted on the revolving housing portion 30, whereby the cam pins 68 extend through the cam sleeve 72 into the slots 70 in the operating ring collar 50. With this construction, axial displacement of the operating ring 16 moves the cam grooves 76 in an axial direction with respect to the cam pins 68 thereby forcing the cam sleeve 72 to rotate within the operating ring 16.

The locking system further includes the movable slide switch 14 for selectively locking the cam sleeve 72 against rotational movement relative to the operating ring 16 to lock the operating ring 16 in a selected magnification setting position. That is, when rotation between the cam sleeve 72 and the operating ring 16 is permitted, the operating ring 16 can be moved axially to adjust the magnification setting. However, when this relative rotation is prevented, the axial position of the operating ring 16 cannot be altered whereby the magnification setting of the zoom lens is fixed.

Figure 5:
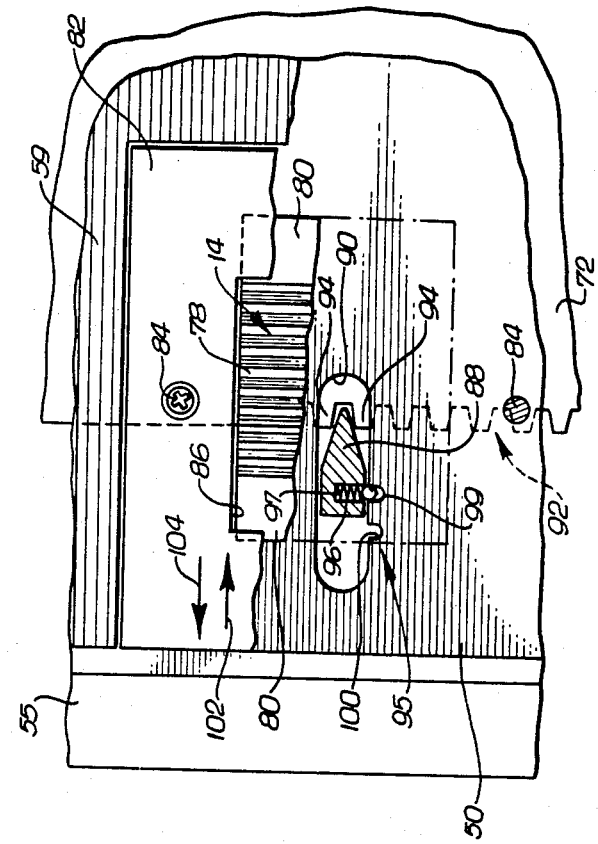
FIG. 5 is an enlarged fragmented plan view taken generally on the line 5—5 of FIG. 2 with portions broken away to illustrate construction details of the locking system.

The slide switch 14 is mounted on the cylindrical collar 50 of the operating ring 16 for axially sliding movement toward and away from the forwardmost end of the cam sleeve 72. More particularly, the slide switch 14 comprises a generally rectangular member having a raised, roughened central portion 78 formed between a pair of axially projecting slide tabs 80. The slide switch is mounted with respect to the operating ring by a rectangular mounting plate 82 which is secured to the ring collar 50 by a pair of screws 84. As shown in FIGS. 2 and 5, the central portion 78 of the slide switch projects outwardly through a central opening 86 in the plate 82, with the slide tabs 80 being received slidably underneath the mounting plate. Accordingly, the roughened central portion 78 of the slide switch 14 is accessible from the exterior of the zoom lens for sliding movement axially back and forth within the plate opening 86.

The slide switch 14 carries an axially projecting ratchet 88 which, as viewed in FIG. 4, can be formed integrally to depend from the underside of the switch. This ratchet 88 is disposed within an opening 90 in the operating ring collar 50 to project radially inwardly to a position axially in front of the cam sleeve 72. Importantly, the ratchet 88 is axially displaced by movement of the slide switch into meshing engagement with a toothed rack 92 defined by a plurality of axially forwardly projecting rack teeth 94 at the forwardmost end of the cam sleeve, as shown in detail in FIG. 5. When the ratchet 88 is in engagement with the rack 92, rotation of the cam sleeve 72 relative to the operating ring 16 is prevented to lock the operating ring in a selected axial position of adjustment.

A spring-detent mechanism 95 is provided for controlling movement of the slide switch between a locked position with the ratchet 88 engaging the rack 92 and an unlocked position with the ratchet axially retracted from the rack. This spring-detent mechanism 95 constitutes a relatively small and lightweight compression spring 96 received within a laterally open bore 97 in the ratchet to urge a relatively small detent ball 98 into one of a pair of axially spaced recesses 99 and 100 lining one side margin of the opening 90 in the operating collar 50. When the slide switch 14 is moved axially in a rearward direction, as illustrated by the arrow 102 in FIG. 5, the ratchet 88 moves into engagement with the rack 92, and the detent ball 98 moves into the rearmost recess 99 to retain the slide switch in the locked position. However, movement of the slide switch 14 axially in a forward direction, as illustrated by the arrow 104 in FIG. 5, moves the detent ball 98 out of the recess 99 and into the forward recess 100 to retain the slide switch 14 in the unlocked position.

In operation, the slide switch is thus movable to permit or prevent rotation of the cam sleeve 72 relative to the operating ring 16 and thereby permit or prevent axial movement of the operating ring 16 to adjust the zoom lens magnification setting. When the slide switch 14 is moved to the unlocked position, the operating ring 16 is freely movable in the axial direction to select the magnification setting, with the cam sleeve 72 rotating throughout such axial movement to displace the rack teeth 94 rotationally with respect to the ratchet 88. However, when it is desired to lock the operating ring in position, the slide switch 14 is moved to bring the ratchet into engagement with the rack 92 between an axially aligned pair of the rack teeth 94. The operating ring 16 will remain in the locked condition until the slide switch is moved to retract the ratchet from the rack. Importantly, while the magnification setting can thus be fixed, rotational movement of the operating ring 16 is permitted to adjust the image focus setting as required.

The locking system of this invention thus provides relatively simple and inexpensive apparatus for selectively locking a zoom lens in a fixed magnification setting. The locking system is quickly and easily moved back and forth between the unlocked and locked positions to permit rapid adjustment and locking of the magnification setting whenever desired.

A variety of modifications and improvements to the invention described herein are believed to be apparent to one skilled in the art. Accordingly, no limitation on the invention is intended, except as set forth in the appended claims.

What is claimed is:

1. In a zoom lens having an operating ring carried about a zoom lens housing and axially movable to adjust the magnification setting of the zoom lens, a locking system for releasably locking the operating ring in a selected position of axial adjustment, comprising:
   a cam sleeve carried by the operating ring for axial movement therewith;
   means for rotating said cam sleeve with respect to the operating ring in response to axial movement of the operating ring; and
   means for selectively locking said cam sleeve against rotation with respect to the operating ring for locking the operating ring against axial movement to adjust the lens magnification setting.

2. The locking system of claim 1 wherein the operating ring includes a pair of axially opposed shoulders, said cam sleeve being positioned axially between said shoulders.

3. The locking system of claim 1 wherein said locking means is movable between a locked position for preventing rotation of said cam sleeve relative to the operating ring and an unlocked position for permitting rotation of said cam sleeve relative to the operating ring.

4. The locking system of claim 3 wherein said locking means comprises a ratchet and a toothed rack including an axially extending plurality of rack teeth, said ratchet and said rack interacting between said operating ring and said cam sleeve, said ratchet being movable between said locked position in engagement with said rack and said unlocked position retracted from said rack.

5. The locking system of claim 4 wherein said ratchet is carried by a slide switch, said slide switch being mounted on the operating ring for movement between the locked and unlocked positions, said rack being carried by said cam sleeve.

6. The locking system of claim 5 including a spring-detent mechanism cooperating between said slide switch and the operating ring for releasably securing said slide switch in said locked and unlocked positions.

7. The locking system of claim 1 wherein said means for rotating said cam sleeve comprises a cam pin mounted on the lens housing to project radially outwardly therefrom, said cam pin being receivable into a generally helical cam groove formed in said cam sleeve whereby axial movement of said cam sleeve with the operating ring translates the cam groove axially with respect to said cam pin.

8. The locking system of claim 7 wherein said cam pin is mounted on a revolving portion of the lens housing, and including means for coupling the operating ring to said revolving housing portion for rotating said revolving housing portion in response to rotation of the operating ring.

9. The locking system of claim 8 wherein said coupling means comprises an axially extending cam slot formed in the operating ring, said cam pin being receivable into said cam slot, said cam sleeve being interposed radially between said revolving housing portion and the operating ring.

10. In a zoom lens having an operating ring carried about a zoom lens housing and axially movable to adjust the magnification setting of the zoom lens, a locking system for releasably locking the operating ring in a selected position of axial adjustment, comprising:
    a rotatable locking member;
    means for constraining said rotatable locking member for axial movement with the operating ring;
    means for rotating said rotatable locking member with respect to the operating ring in response to axial movement of the operating ring; and
    means for selectively locking said rotatable locking member against rotation relative to the operating ring for selectively locking the operating ring against axial movement to adjust the lens magnification setting.

11. The locking system of claim 10 wherein said locking means is movable between a locked position for preventing rotation of said rotatable locking member relative to the operating ring and an unlocked position for permitting rotation of said rotatable locking member relative to the operating ring.

12. In a zoom lens having an operating ring carried about a zoom lens housing and axially movable to adjust the magnification setting of the zoom lens, a locking system for releasably locking the operating ring in a selected position of axial adjustment, comprising:
 a cam sleeve carried concentrically within the operating ring;
 means for moving said cam sleeve axially with the operating ring and rotationally relative to the operating ring in response to axial movement of the operating ring; and
 means for selectively engaging said cam sleeve for selectively preventing rotation of said cam sleeve with respect to the operating ring for locking the operating ring against axial movement to adjust the lens magnification setting.

13. The locking system of claim 12 wherein said engaging means is movable between a locked position for preventing rotation of said cam sleeve relative to the operating ring and an unlocked position for permitting rotation of said cam sleeve relative to the operating ring.

14. The locking system of claim 12 wherein said moving means comprises a pair of axially opposed shoulders on the operating ring, said cam sleeve being positioned axially between said shoulders, and a cam pin mounted on the lens housing to project radially outwardly therefrom, said cam pin being receivable into a generally helical cam groove formed in said cam sleeve whereby axial movement of said cam sleeve with the operating ring translates the cam groove axially with respect to said cam pin.

15. In a zoom lens having an operating ring carried about a zoom lens housing and axially movable to adjust the magnification setting of the zoom lens, a locking system for releasably locking the operating ring in a selected position of axial adjustment, comprising:
 a cam sleeve carried concentrically within the operating ring;
 a pair of axially opposed shoulders on the operating ring, said cam sleeve being positioned axially between said shoulders whereby said cam sleeve is movable axially with the operating ring;
 a cam pin projecting radially outwardly from the lens housing, said cam pin being receivable into a generally helical cam groove formed in said cam sleeve whereby said cam sleeve rotates about the lens housing in response to axial movement of the operating ring; and
 means for selectively engaging said cam sleeve for preventing rotation thereof about the lens housing for correspondingly locking the operating ring against axial movement to adjust the lens magnification setting.

16. The locking system of claim 15 wherein said cam pin is mounted on a revolving portion of the lens housing, and wherein said cam pin is receivable through said cam groove in said cam sleeve and into an axially extending cam slot formed in the operating ring, said cam sleeve being interposed radially between said revolving housing portion and the operating ring.

17. The locking system of claim 16 wherein said engaging means comprises a ratchet carried by the operating ring and a toothed rack carried by said cam sleeve, said ratchet being movable between a locked position in engagement with said rack to prevent relative rotation of said cam sleeve and an unlocked position retracted from said rack to permit relative rotation of said cam sleeve.

18. The locking system of claim 17 wherein said ratchet is carried by a slide switch, said slide switch being mounted on the operating ring for movement between the locked and unlocked positions.

19. The locking system of claim 18 including a spring-detent mechanism cooperating between said slide switch and the operating ring for releasably securing said slide switch in said locked and unlocked positions.

20. A zoom lens, comprising:
 a first generally cylindrical housing portion adapted for connection to a camera;
 a second generally cylindrical housing portion mounted for rotational movement with respect to said first housing portion, said second housing portion including a focusing optical element and means for adjusting the axial position of said focusing element in response to rotational movement of said second housing portion;
 a third generally cylindrical housing portion mounted for axial sliding movement with respect to said first and second housing portion, said third housing portion including at least one zoom element for adjusting the magnification setting of the zoom lens upon axial movement of said third housing portion;
 an external generally cylindrical operating ring mounted about said first housing portion and connected to said second and third housing portions for rotational movement with respect to said first and third housing portions to adjust the rotational position of said second housing portion and for axial sliding movement with respect to said first and second housing portions to adjust the axial position of said third housing portion;
 a cam sleeve carried by said operating ring for axial movement therewith and interposed between said operating ring and said second housing portion;
 a cam pin mounted on said second housing portion and projecting radially outwardly therefrom for reception into a generally helical cam groove formed in said cam sleeve, whereby axial movement of said cam sleeve with said operating ring causes said cam sleeve to rotate relative to said operating ring;
 an axially projecting toothed rack formed on said cam sleeve; and
 a ratchet mounted on said operating ring for movement between a locked position in engagement with said rack to prevent relative rotation of said cam sleeve for locking said operating ring against axial movement, and an unlocked position retracted from said rack to permit relative rotation of said cam sleeve and thereby also permit axial movement of said operating ring.

* * * * *